Oct. 1, 1946.  D. E. GILLUM ET AL  2,408,392
VIBROMETER
Filed Nov. 29, 1941
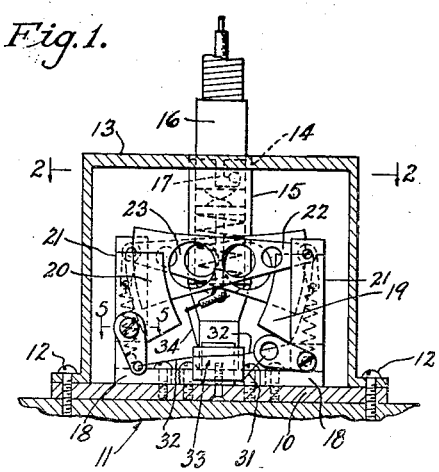
Fig. 1.
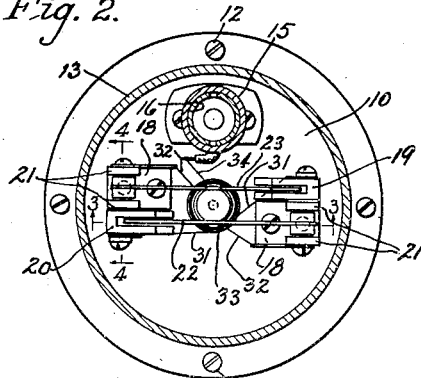
Fig. 2.
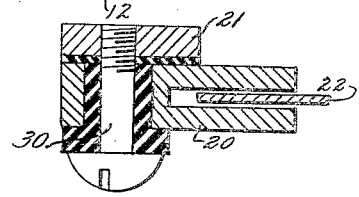
Fig. 5.
Fig. 3.
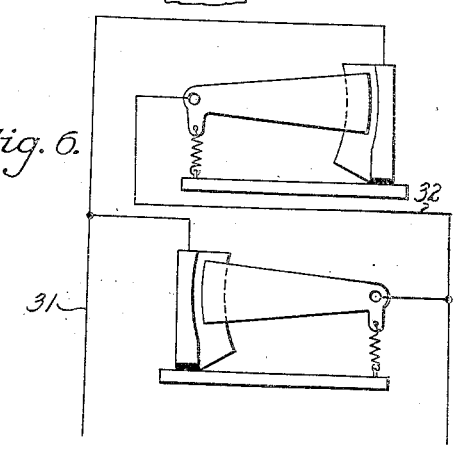
Fig. 6.
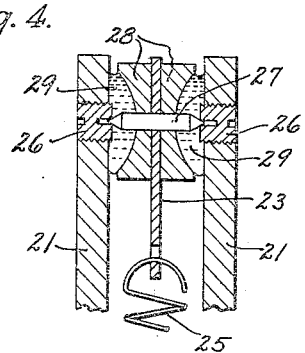
Fig. 4.
INVENTOR.
Charles J. Gallant
and Donald E. Gillum
BY Carlos G. Stratton
ATTORNEY Patented Oct. 1, 1946

2,408,392

UNITED STATES PATENT OFFICE 2,408,392

VIBROMETER

Donald E. Gillum, Hermosa Beach, and Charles J. Gallant, Brentwood Heights, Calif., assignors to North American Aviation, Inc., Inglewood, Calif., a corporation of Delaware Application November 29, 1941, Serial No. 421,078

5 Claims. (Cl. 177—311)

The present invention relates generally to electrical vibrometers, the recordings of which are lineal, the amplitude of recording being directly proportional to the amplitude of vibration irrespective of frequency, and has for its main purpose the provision of a displacement measuring instrument of this type which is particularly adapted and suited to the recording of vibrations in aircraft and parts thereof, although not necessarily limited to such use.

In furtherance of the above general purpose, it is an object of the invention to produce a small, lightweight displacement measuring unit, combining high sensitivity, wide frequency range, and a high degree of calibration stability.

It may be said to be a further object to provide an instrument of this type in the nature of a variable capacity pick-up which may be made light in weight whereby the weight of the instrument itself will have a minimum effect upon its operation; which will eliminate friction as a factor of inefficiency, and which will have a low natural period of oscillation so as to effectively determine the characteristics of relatively low frequency vibrations.

In providing a vibrometer of variable capacitance pick-up type, it is a further object to utilize bodies of rotation in a manner which will cancel out the effect of torsional vibrations, leaving the instrument sensitive to only the lineal components of vibrations being measured.

With these and other objects in mind, the invention proposes in a general way the use of a pick-up in which statically balanced members are opposed to vibration responsive members in a manner to constitute a variable condenser. This condenser is connected across the terminals of an inductance coil, forming a radio frequency tuned or resonant circuit. It is contemplated in practice that such a coil may be suitably connected to a recording instrument such as a recording oscillograph, as for example by inductively connecting the coil to a source of constant radio frequency, such as an oscillator amplifier, the inductance of the coil and the maximum capacity of the condenser being such that the resonant frequency of the pick-up is the same as the frequency of the oscillator whereby maximum energy is transferred from the oscillator to the pick-up when they are in resonance, and a minimum when they are detuned or out of resonance. If the pick-up is vibrated, causing a relative movement between the members of the condenser, the resultant change in capacity changes the tuning of its resonant frequency, so that the oscillator amplifier translates the variation in capacity into electrical impulses of sufficient magnitude to operate the galvanometer or other responsive element of a recording instrument, such as a recording oscillograph.

The pick-up instrument, constituting the present invention, as hereinafter set forth in greater detail, may be better understood by reference to the accompanying drawing, in which the best mode thus far devised for carrying the same into practical effect, is illustrated mechanically and diagrammatically. In this drawing, which forms a part of this specification, Fig. 1 is a vertical sectional view through the pick-up instrument.

Fig. 2 is a horizontal sectional view therethrough taken substantially on line 2—2 of Fig. 1.

Fig. 3 is an enlarged fragmentary view partly in elevation and partly in section, of one of the condensers, looking substantially along the line 3—3 of Fig. 2.

Fig. 4 is a detail vertical sectional view through the bearing of one of the rotors, looking substantially along line 4—4 of Fig. 2.

Fig. 5 is a detail horizontal sectional view through the supporting connection of one of the stators, looking substantially along the line 5—5 of Fig. 1.

Fig. 6 is a view illustrating in diagram the electrical hook-up of the stators and rotors.

Referring now to the pick-up as a mechanical instrument responsive to vibrations, and shown in detail in Figs. 1 to 5, a generally flat mounting base is indicated at 10. This base member is used as a means of securing the instrument or unit to a test member or frame, indicated at 11, and may, therefore, be made to coincide more or less with the test member or frame as may be necessary to properly mount the unit for vibration with, and in accord with, vibrations of the test frame to be measured.

The base member 10 may be secured to the test frame 11 by the same screws or other fastening members 12 utilized to hold, on the base member, a shell or cover 13 whose purpose is to protect the working parts of the unit from dust and damage. This shell or cover, it will be noted, has a top opening 14 receiving the upper open end of a socket 15 in which a plug 16 is disposed with a bayonet or other secure holding connection, indicated at 17, for plugging in such external electrical connections as may be used, for example, to record the vibrations developed by the vibration responsive means.

Secured to, and upstanding from the base member 10, in spaced apart, slightly offset relation, are a pair of brackets 18 and to relatively opposite sides of these brackets, and insulated therefrom, are rigidly secured the stationary elements, or stators 19 and 20 of a pair of relatively opposed variable condensers. The brackets 18 include parallel upright posts 21 between which are pivoted the smaller ends of segmental fins 22 and 23 constituting the movable elements or rotors of the condensers.

The offsetting of the brackets 18 relative to each other alines the stator of one bracket with the rotor of the other bracket, as plainly seen in Fig. 2, and each fin is normally held in horizontal position with its larger free end in effective relation to its relatively opposite stator, each fin having at its smaller pivoted end a depending angular extension 24 connected by a balance spring 25 to its respective bracket 18 in order to seismically support the fin whose form is preferably such as to place its center of gravity as nearly as possible to its free end.

In order to eliminate friction, the posts 21 of each bracket support adjustable pivot bearing members 26, as seen best in Fig. 4, having inner recesses cooperating with the conical ends of a balance staff 27 to form needle point bearings for the fin pivots. The staff 27 is pressed through its respective fin and through damping fluid cups 28 at opposite sides of the fin. The cups 28 present outer concave faces spaced from the adjacent inner surfaces of the posts 21 to maintain therein, by surface tension and capillarity, a suitable damping fluid, indicated at 29, around the needle point bearings.

The manner of insulating each stator from, and connecting the same to, one of the posts 21 of its respective bracket 18 is plainly seen in Figs. 3 and 5, a connecting bolt appearing at 30.

The two variable condensers formed in the manner just set forth, are connected in parallel, as by wires 31 and 32, respectively which may join the stators and rotors, across the terminals of an inductance coil to thus form a radio frequency tuned or resonant circuit.

It will be understood that relative motion between the damped, balanced rotor fins 22, 23 and the base, including the stators 19, 20 is directly proportional to the vibrations of the member 11 to which the base is attached. Therefore, as each respective rotor and stator constitutes a variable condenser, the capacity of this condenser varies in direct proportion to the amplitude of vibration. Were a single condenser of this character utilized in connection with lineal vibrations occurring in a single plane at right angles to the length of the stator fin, it would be sufficient, but since such vibrations are seldom in practice and since the fin is a body of rotation and is sensitive to torsional vibration, the two identical condensers are used in the opposed manner previously set forth so as to cancel the effect of torsional vibrations and leave the unit sensitive to only the lineal components of vibrations.

As clearly illustrated in Figures 1, 2, 3 and 5, the stators 19 and 20 are U-shaped and receive the larger ends of the fins 22 and 23 between their free ends, such larger ends of the fins extending substantially completely within the depth of the U. With such construction, any vibratory movement of the base 11 in a direction other than in a plane normal to the base will be translated into a sidewise movement of the fins 22 and 23. However, inasmuch as the effective ends of the fins 22 and 23 are disposed within the U-shaped stators there will be no change in the capacitance of the condenser and therefore no change in a recording instrument to which the vibrometer is connected. With such construction, no variation in capacitance of the condenser and resultant change in a recording instrument will be had except in response to vibratory movement in a direction normal to the base 11 and to the transverse axes of the fins 22 and 23 in a direction normal to the base 11. It is obvious that as thus described, the vibrometer as proposed therein has many advantages in practical use in that the pick-up requires but one, single conductor shielded, lead and is of small size and light weight adaptable for practical use in many instances where, in aircraft vibration measuring, a larger, heavier pick-up would be unusable. In addition to its light weight and compactness, the pick-up as set forth herein provides a device by means of which the characteristics of relatively low frequency vibrations may be readily and accurately determined by reason of an output proportional to amplitude of vibration independent of frequency. The fact that alternating current amplifiers may be used, increases the overall frequency response.

While we have illustrated and described what we now regard as the preferred embodiment of our invention, the construction is, of course, subject to modifications without departing from the spirit and scope of our invention. We, therefore, do not wish to restrict ourselves to the particular form of construction illustrated and described, but desire to avail ourselves of all modifications that may fall within the scope of the appended claims.

Having thus described our invention, what we claim and desire to secure by Letters Patent is:

1. A vibrometer comprising a base adapted to be placed adjacent a vibrating body, a pair of variable condensers connected in parallel mounted on said base and including a pair of stators and a pair of rotors, and means for seismically supporting the rotors with respect to the stators so that vibrations transmitted to the base will produce relative movement of the rotors the stators and rotors being so positioned that vibrational forces in a direction perpendicular to the plane of the base cause the capacities to increase or decrease simultaneously while torsional vibrations will increase the capacity of one condenser when decreasing the capacity of the other.

2. A vibrometer comprising a base adapted to be placed adjacent a vibrating body, a pair of variable condensers connected in parallel mounted on said base and including a pair of stators and a pair of rotors, the rotors being pivoted at one of their ends and each one of the pair of stators being in substantial alignment with the pivot of one of the rotors, and means for seismically supporting the rotors with respect to the stators so that vibrations transmitted to the base will produce relative movement of the rotors the stators and rotors being so positioned that vibrational forces in a direction perpendicular to the plane of the base cause the capacities to increase or decrease simultaneously while torsional vibrations will increase the capacity of one condenser when decreasing the capacity of the other.

3. A vibrometer comprising a base adapted to be placed adjacent a vibrating body, a pair of variable condensers connected in parallel mounted on said base and including a pair of stators and a pair of plate-like rotors pivotally mounted at one of their ends, and means for seismically supporting the rotors with respect to the stators so that vibrations transmitted to the base will produce relative movement of the rotors, the stators and rotors being so positioned that vibrational forces in a direction perpendicular to the plane of the base cause the capacities to increase or decrease simultaneously while torsional vibrations will increase the capacity of one condenser when decreasing the capacity of the other.

4. A vibrometer comprising a base adapted to be placed adjacent a vibrating body, a pair of variable condensers connected in parallel carried by said base and including a pair of U-shaped stators mounted on the base with the U extending normal to the plane of the base, a pair of plate-like rotors, each pivotally mounted adjacent one of its ends and having its opposite free end extending within the U of one of the U-shaped stators, and means for seismically supporting the free ends of the rotors in effective relation with respect to the stators so that vibrations transmitted to the base will produce movement of the free ends of the rotors relative to the stators and resultant change in capacitance of the condenser, the stators and rotors being so positioned that vibrational forces in a direction perpendicular to the plane of the base cause the capacities to increase or decrease simultaneously while torsional vibrations will increase the capacity of one condenser when decreasing the capacity of the other.

5. A vibrometer comprising a base adapted to be placed adjacent a vibrating body, a pair of variable condensers connected in parallel carried by said base and including a pair of U-shaped stators mounted on the base with the U extending normal to the plane of the base, a pair of plate-like rotors, each pivotally mounted adjacent one of its ends and having its opposite free end extending within the U of one of the U-shaped stators and each one of the pair of stators being in substantial alignment with the pivot of one of the rotors, and means for seismically supporting the free ends of the rotors in effective relation with respect to the stators so that vibrations transmitted to the base will produce movement of the free ends of the rotors relative to the stators and resultant change in capacitance of the condenser, the stators and rotors being so positioned that vibrational forces in a direction perpendicular to the plane of the base cause the capacities to increase or decrease simultaneously while torsional vibrations will increase the capacity of one condenser when decreasing the capacity of the other.

DONALD E. GILLUM.
CHARLES J. GALLANT.